(12) United States Patent
Kanata et al.

(10) Patent No.: US 12,103,562 B2
(45) Date of Patent: Oct. 1, 2024

(54) AUTONOMOUS DELIVERY BOX AND DELIVERY SYSTEM

(71) Applicant: TOYOTA JIDOSHA KABUSHIKI KAISHA, Aichi-ken (JP)

(72) Inventors: Tetsuya Kanata, Toyota (JP); Masao Tajima, Toyota (JP); Takashi Hayashi, Toyota (JP); Nobuyuki Tomatsu, Nagoya (JP); Hideki Fukudome, Nisshin (JP); Takashi Hayashi, Nagoya (JP); Yoshiumi Kawamura, Nisshin (JP); Kosuke Akatsuka, Mishima (JP); Manabu Yamamoto, Toyota (JP); Kosuke Sakakibara, Toyota (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 277 days.

(21) Appl. No.: 17/533,111

(22) Filed: Nov. 23, 2021

(65) Prior Publication Data

US 2022/0177010 A1    Jun. 9, 2022

(30) Foreign Application Priority Data

Dec. 7, 2020    (JP) .................. 2020-203012

(51) Int. Cl.
*B60W 60/00* (2020.01)
*B60P 3/00* (2006.01)
(Continued)

(52) U.S. Cl.
CPC ....... *B60W 60/00256* (2020.02); *B60P 3/007* (2013.01); *B60R 25/24* (2013.01);
(Continued)

(58) Field of Classification Search
CPC ....... B60W 60/00256; B60W 60/0011; B60W 2555/00; B60P 3/007; B60R 25/24;
(Continued)

(56) References Cited

U.S. PATENT DOCUMENTS 9,256,852 B1 *    2/2016 Myllymaki ......... G05D 1/0088
10,241,516 B1 *    3/2019 Brady ............... G06Q 10/0832
(Continued)

FOREIGN PATENT DOCUMENTS

CN    103280008 A1 *    5/2013
JP    H06-008027 U    2/1994
(Continued)

OTHER PUBLICATIONS

Translation of CN 103280008 A1 (Year: 2013).*

*Primary Examiner* — Navid Z. Mehdizadeh
*Assistant Examiner* — Shelley Marie Osterhout
(74) *Attorney, Agent, or Firm* — HAUPTMAN HAM, LLP

(57) ABSTRACT

An autonomous delivery box includes a first memory, a first processor coupled to the first memory, and a delivery box configured to house a package. The autonomous delivery box is configured to travel autonomously between a dispatch base from which the package is dispatched and a handover location at which the package is handed over. The first processor is configured to authenticate opening permission for a door of the delivery box, and to control whether or not the autonomous delivery box is permitted to travel such that the autonomous delivery box is not permitted to travel in a case in which a travel-permitting condition of the autonomous delivery box has not been satisfied at the handover location.

8 Claims, 11 Drawing Sheets

(51) Int. Cl.
*B60R 25/24* (2013.01)
*G01C 21/34* (2006.01)
*G06Q 10/0832* (2023.01)
*G06Q 40/08* (2012.01)

(52) U.S. Cl.
CPC ..... *B60W 60/0011* (2020.02); *G06Q 10/0832* (2013.01); *G06Q 40/08* (2013.01); *B60W 2555/00* (2020.02); *G01C 21/3461* (2013.01)

(58) Field of Classification Search
CPC .. G06Q 10/0832; G06Q 40/08; G06Q 10/047; G06Q 10/08355; G01C 21/3461; G01C 21/3407; G07F 17/13; G07F 9/105; B62D 63/02
See application file for complete search history.

(56) References Cited

U.S. PATENT DOCUMENTS

| | | | | |
|---|---|---|---|---|
| 10,520,945 | B2* | 12/2019 | Cantrell | ........... G06Q 10/08355 |
| 2006/0074779 | A1 | 4/2006 | Washizuka et al. | |
| 2014/0180914 | A1* | 6/2014 | Abhyanker | ........ G06Q 10/0832 |
| | | | | 705/332 |
| 2017/0147975 | A1* | 5/2017 | Natarajan | ........... H04L 63/0876 |
| 2019/0114564 | A1* | 4/2019 | Ferguson | ................ B64C 39/02 |
| 2019/0244460 | A1 | 8/2019 | Kaneko et al. | |
| 2019/0287063 | A1* | 9/2019 | Skaaksrud | ............. B25J 9/1679 |
| 2020/0218281 | A1 | 7/2020 | Ono | |
| 2020/0288895 | A1* | 9/2020 | Bennet | ................. H04W 12/03 |
| 2021/0142276 | A1* | 5/2021 | Gupte | ................ G06Q 10/0838 |
| 2021/0319394 | A1* | 10/2021 | Tazume | ................. G06Q 10/08 |

FOREIGN PATENT DOCUMENTS

| | | |
|---|---|---|
| JP | 2002-109404 A | 4/2002 |
| JP | 2006315645 A | 11/2006 |
| JP | 2019-131391 A | 8/2019 |
| JP | 2019210607 A | 12/2019 |
| WO | 2019/039014 A1 | 2/2019 |
| WO | WO-2019090196 A1 * 5/2019 ........... B65G 1/0407 |
| WO | 2019124335 A1 | 6/2019 |

* cited by examiner

AUTONOMOUS DELIVERY BOX AND DELIVERY SYSTEM

CROSS-REFERENCE TO RELATED APPLICATION

This application claims priority under 35 USC 119 from Japanese Patent Application No. 2020-203012 filed Dec. 7, 2020, the disclosure of which is incorporated by reference herein in its entirety.

BACKGROUND

Technical Field

The present disclosure relates to an autonomous delivery box and a delivery system.

Related Art

Japanese Patent Application Laid-Open (JP-A) No. 2019-210607 discloses technology relating to a home delivery box that hands over a package, this being a delivery item. In this technology, the home delivery box is installed at a location such as an entrance hall of a multi-unit housing complex, a railway station, or a convenience store, and two-way communication is performed between a mobile terminal of a user and a control section that controls locking and unlocking of an electronic lock provided to the home delivery box.

For example, when a user performs an unlocking operation, authentication is performed to establish whether the user is an approved user of the home delivery box, and determination is made as to whether or not to unlock the electronic lock before unlocking is permitted. When the electronic lock is unlocked, a door opens, allowing an item inside the home delivery box to be retrieved.

SUMMARY

Recent years have seen increasingly severe staff shortages in the logistics and distribution sector, and there is hope that technology may enable automated delivery during a final stretch from a final dispatch base to the delivery destination.

Autonomous-traveling home delivery boxes (delivery boxes) have accordingly been investigated, but there remains room for improvement, including with respect to the safe deployment of such autonomous home delivery boxes.

In consideration of the above circumstances, the present disclosure provides an autonomous delivery box and a delivery system that are configured to house a package for delivery and to travel safely.

An autonomous delivery box of a first aspect of the present disclosure includes a first memory, a first processor coupled to the first memory, and a delivery box configures to house a package. The autonomous delivery box is configured to travel autonomously between a dispatch base from which the package is dispatched and a handover location at which the package is handed over. The first processor is configured to authenticate opening permission for a door of the delivery box; and control whether or not the autonomous delivery box is permitted to travel such that the autonomous delivery box is not permitted to travel in a case in which a travel-permitting condition of the autonomous delivery box has not been satisfied at the handover location.

The autonomous delivery box of the first aspect is configured to travel autonomously between the dispatch base from which the package is dispatched and the handover location at which the package is handed over. The autonomous delivery box includes the first memory and the first processor coupled to the memory. The autonomous delivery box is provided with the delivery box that is configured to house the package, and the first processor authenticates opening permission for the door of the delivery box.

The first processor controls whether or not the autonomous delivery box is permitted to travel, such that the autonomous delivery box is not permitted to travel in a case in which the travel-permitting condition of the autonomous delivery box has not been satisfied at the handover location. In other words, the autonomous delivery box is permitted to travel in a case in which the travel-permitting condition has been satisfied.

In the present disclosure, by setting the travel-permitting condition of the autonomous delivery box in this manner, the autonomous delivery box is not allowed to travel in a case in which the safety of the autonomous delivery box is not ensured.

An autonomous delivery box of a second aspect of the present disclosure is the autonomous delivery box of the first aspect, wherein the travel-permitting condition includes the door being closed.

In the autonomous delivery box of the second aspect, the travel-permitting condition includes the door of the delivery box being closed. The processer thereby permits the autonomous delivery box to travel when the door of the delivery box is closed.

For example, were the autonomous delivery box to travel in a state in which the door of the delivery box was open, there is a possibility that the door might interfere with peripheral portions of the autonomous delivery box. Accordingly, there is a need for the autonomous delivery box to not be allowed to travel in a state in which the door of the delivery box is open.

Thus, in a case in which the door of the delivery box is not closed, the travel-permitting condition is not satisfied, and the first processor does not allow the autonomous delivery box to travel. This guarantees safety when the autonomous delivery box is allowed to travel.

Note that herein a "closed door" refers to a state in which the door of the delivery box is closed, and so the door does not have to be locked by electronic locking.

An autonomous delivery box of a third aspect of the present disclosure is the autonomous delivery box of the second aspect, wherein the travel-permitting condition further includes completion of a handover procedure to a user who receives the package.

In the autonomous delivery box of the third aspect, when the travel-permitting condition that the handover procedure to the user who receives the package is complete, the first processor permits the autonomous delivery box to travel. Conversely, in the present disclosure, in a case in which the user handover procedure is not completed, the autonomous delivery box does not travel. The user can thus be suppressed from forgetting to take the package.

Note that in a case in which the user is to receive plural packages, the autonomous delivery box is permitted to travel on completion of the handover procedure for all of the plural packages by the user.

An autonomous delivery box of a fourth aspect of the present disclosure is the autonomous delivery box of any one of the first aspect to the third aspect, wherein the first processor is configured to change an authentication level according to an insured value of the package.

In the autonomous delivery box of the fourth aspect, the first processor is configured to change the authentication level according to the insured value of the package. This enables the authentication level to be set higher in a case in which the package has a high value than in a case in which the package has a low value. This ensures safety of the package appropriate to the insured value of the package.

An autonomous delivery box of a fifth aspect of the present disclosure is the autonomous delivery box of any one of the first aspect to the fourth aspect, wherein the autonomous delivery box is provided with plural of the delivery boxes.

The autonomous delivery box of the fifth aspect is provided with the plural delivery boxes that are configured to house packages. This enables a single autonomous delivery box to deliver packages to plural users, and is thereby useful for making deliveries to a multi-unit housing complex or the like.

A delivery system of a sixth aspect of the present disclosure is a delivery system in which the autonomous delivery box of any one of the first aspect to the fifth aspect travels between a dispatch base from which a package is dispatched and a handover location at which the package is handed over in order to deliver the package from the dispatch base to the handover location. The delivery system includes a second memory, and a second processor coupled to the second memory. The second processor is configured to set a travel route for the autonomous delivery box to travel between the dispatch base and the handover location, and modify the travel route of the autonomous delivery box in accordance with a type of the package.

In the delivery system of the sixth aspect, the second processor sets the travel route of the autonomous delivery box, and is configured to modify the travel route in accordance with the package type.

For example, in a case in which the package is not perishable and can be delivered by standard delivery, the travel route is set to enable efficient delivery by the autonomous delivery box, taking into consideration factors such as the ease of travel, distance, and journey time. On the other hand, in a case in which the package contains refrigerated goods, frozen goods, or the like, an increase in the temperature of the package during delivery would be a concern when a travel route is set to travels through sunlit areas. In such cases, the travel route is modified to a travel route traveling through shaded areas, thereby enabling any increase in the temperature of the package during delivery to be suppressed.

A delivery system of a seventh aspect of the present disclosure is the delivery system of the sixth aspect, wherein in a case in which the package contains refrigerated goods or frozen goods, the second processor modifies the travel route to a travel route traveling through shaded areas.

In the delivery system of the seventh aspect, in a case in which the package contains refrigerated goods or frozen goods, an increase in the temperature of the package during delivery would be a concern when the autonomous delivery box is set to travel through sunlit areas. Thus, shaded areas are detected based on the position of the sun, and the second processor modifies the travel route to a travel route traveling through shaded areas. This enables the autonomous delivery box to travel through shaded areas, enabling any increase in the temperature of the package during delivery to be suppressed.

A delivery system of an eighth aspect of the present disclosure is the delivery system of the sixth aspect, wherein in a case in which the package contains a high-value item, the second processor modifies the travel route to a travel route traveling through areas less prone to crime.

In the delivery system of the eighth aspect, in a case in which the package contains a high-value item, theft of or damage to the autonomous delivery box would be a concern when the autonomous delivery box is set to travel through areas that are likely to be more prone to crime. Thus, the second processor modifies the travel route of the autonomous delivery box to a travel route traveling through areas that are likely to be less prone to crime. This enables the autonomous delivery box to travel through areas that are likely to be less prone to crime, enabling the autonomous delivery box to be suppressed from coming to harm.

A delivery system of a ninth aspect of the present disclosure is the delivery system of the sixth aspect, wherein in a case in which the package contains food, the second processor modifies the travel route to a travel route traveling through areas in which there are few wild birds and animals.

In the delivery system of the ninth aspect, in a case in which the package contains food, wild birds and animals approaching the autonomous delivery box would be a concern when the autonomous delivery box is set to travel through areas in which there are more wild birds and animals. Thus, the second processor modifies the travel route of the autonomous delivery box to a travel route traveling through areas in which there are likely to be fewer wild birds and animals. This enables the autonomous delivery box to travel through areas in which there are likely to be fewer wild birds and animals, enabling harm due to wild birds and animals to be suppressed.

As described above, the autonomous delivery box of the first aspect has excellent advantageous effects of being configured to house a package for delivery and to travel safely.

The autonomous delivery box of the second aspect cannot travel when the door of the delivery box is not closed, and so has an excellent advantageous effect of enabling safety to be guaranteed.

The autonomous delivery box of the third aspect has an excellent advantageous effect of enabling forgotten packages to be suppressed.

The autonomous delivery box of the fourth aspect has an excellent advantageous effect of enabling package safety to be guaranteed.

The autonomous delivery box of the fifth aspect has an excellent advantageous effect of enabling respective packages to be delivered to plural users.

The delivery system of the sixth aspect has an excellent advantageous effect of enabling the travel route to be modified in accordance with the package type.

The delivery system of the seventh aspect has an excellent advantageous effect of enabling any increase in the temperature of the package during delivery to be suppressed in a case in which the package contains refrigerated goods or frozen goods.

The delivery system of the eighth aspect has an excellent advantageous effect of enabling the package to be suppressed from coming to harm due to theft or the like in a case in which the package contains a high-value item.

The delivery system of the ninth aspect has an excellent advantageous effect of enabling the package to be suppressed from coming to harm due to wild birds and animals in a case in which the package contains food.

BRIEF DESCRIPTION OF THE DRAWINGS

Preferred embodiments will be described in detail based on the following figures, wherein.

DETAILED DESCRIPTION

Explanation follows regarding an autonomous delivery box and a delivery system according to an exemplary embodiment of the present disclosure, with reference to the drawings.

Outline

Figure 1:
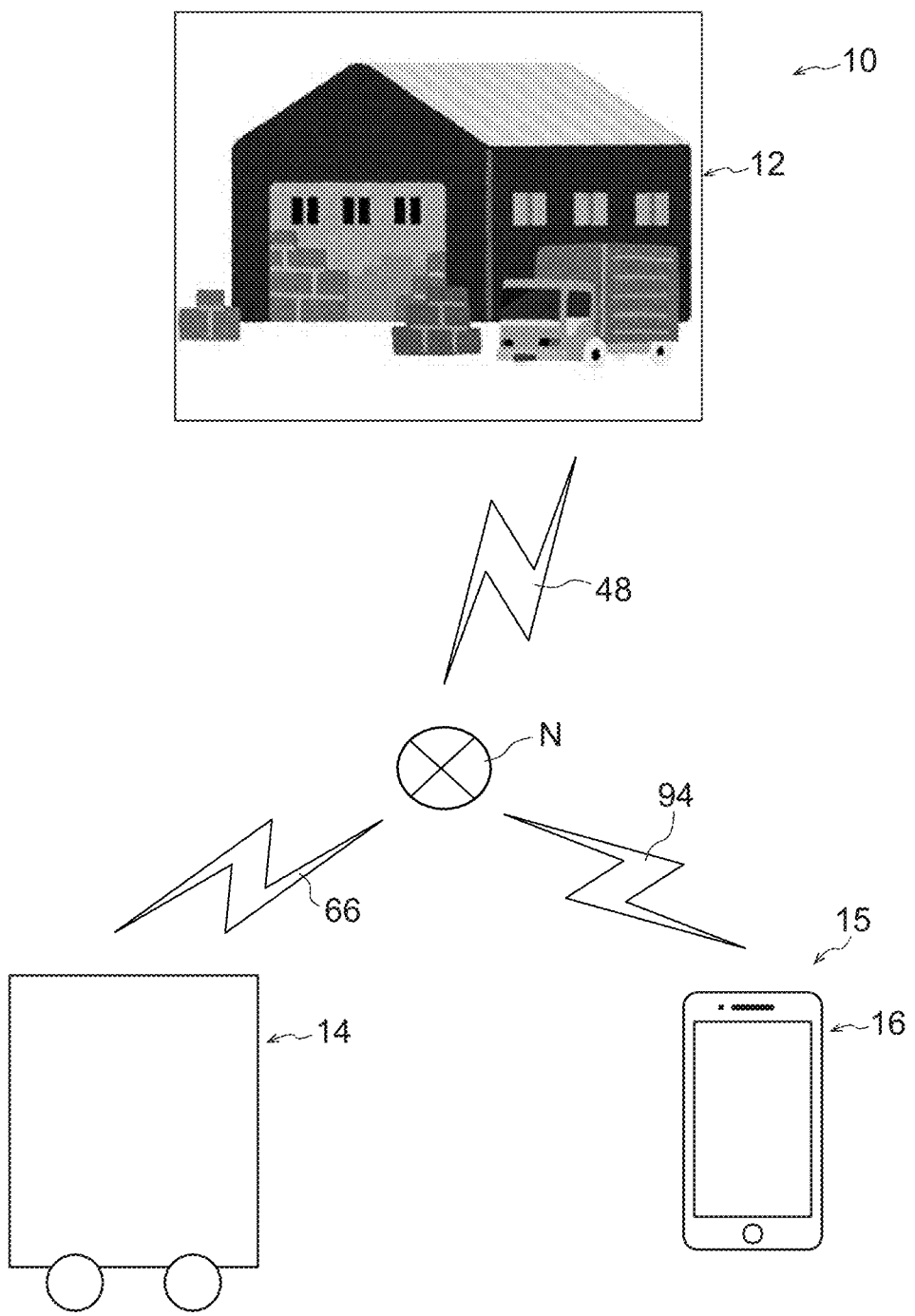
FIG. 1 is a diagram illustrating a configuration of a delivery system employing an autonomous delivery box according to an exemplary embodiment.

As illustrated in FIG. 1, a delivery system 10 includes, for example, a server 20 at a dispatch center 12 configuring a dispatch base from which a package P for delivery (see FIG. 2) is dispatched, an autonomous home delivery pallet 14 serving as an autonomous delivery box in which the package P for home delivery is housed, and a terminal 16 of a user configuring one handover location for handover of the package P. The server 20, the autonomous home delivery pallet 14, and the user terminal 16 communicate with one another over a network N.

The delivery system 10 provides a service in which a package P purchased by a user is housed in the autonomous home delivery pallet 14 and delivered to a delivery destination stipulated by the user. The autonomous home delivery pallet 14 is configured to autonomously travel between the dispatch center 12 from which the package P is dispatched and a user home 15 at which the package P is handed over. Note that although a user who purchases a product and a recipient who receives the product may be different people, in the interests of simplicity, in the present exemplary embodiment a case is described in which the user and the recipient are the same person.

Autonomous Home Delivery Pallet Configuration

First, explanation follows regarding configuration of the autonomous home delivery pallet.

Figure 2:
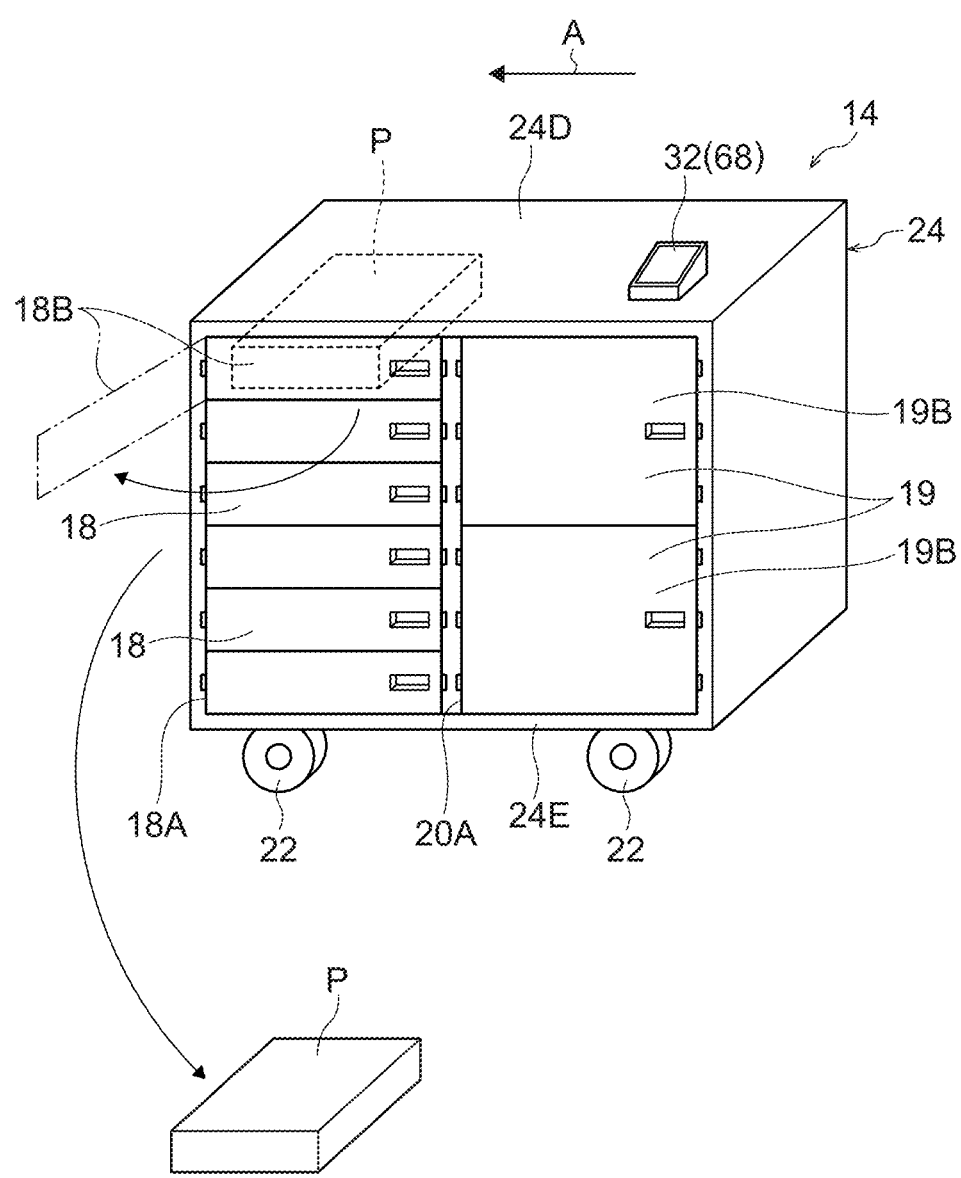
FIG. 2 is a perspective view illustrating an autonomous delivery box according to an exemplary embodiment.

FIG. 2 is a perspective view illustrating a structure of the autonomous home delivery pallet 14. The autonomous home delivery pallet 14 is configured including plural home delivery boxes (delivery boxes) 18, 19 and plural wheels 22 enabling the autonomous home delivery pallet 14 to move.

Figure 3:
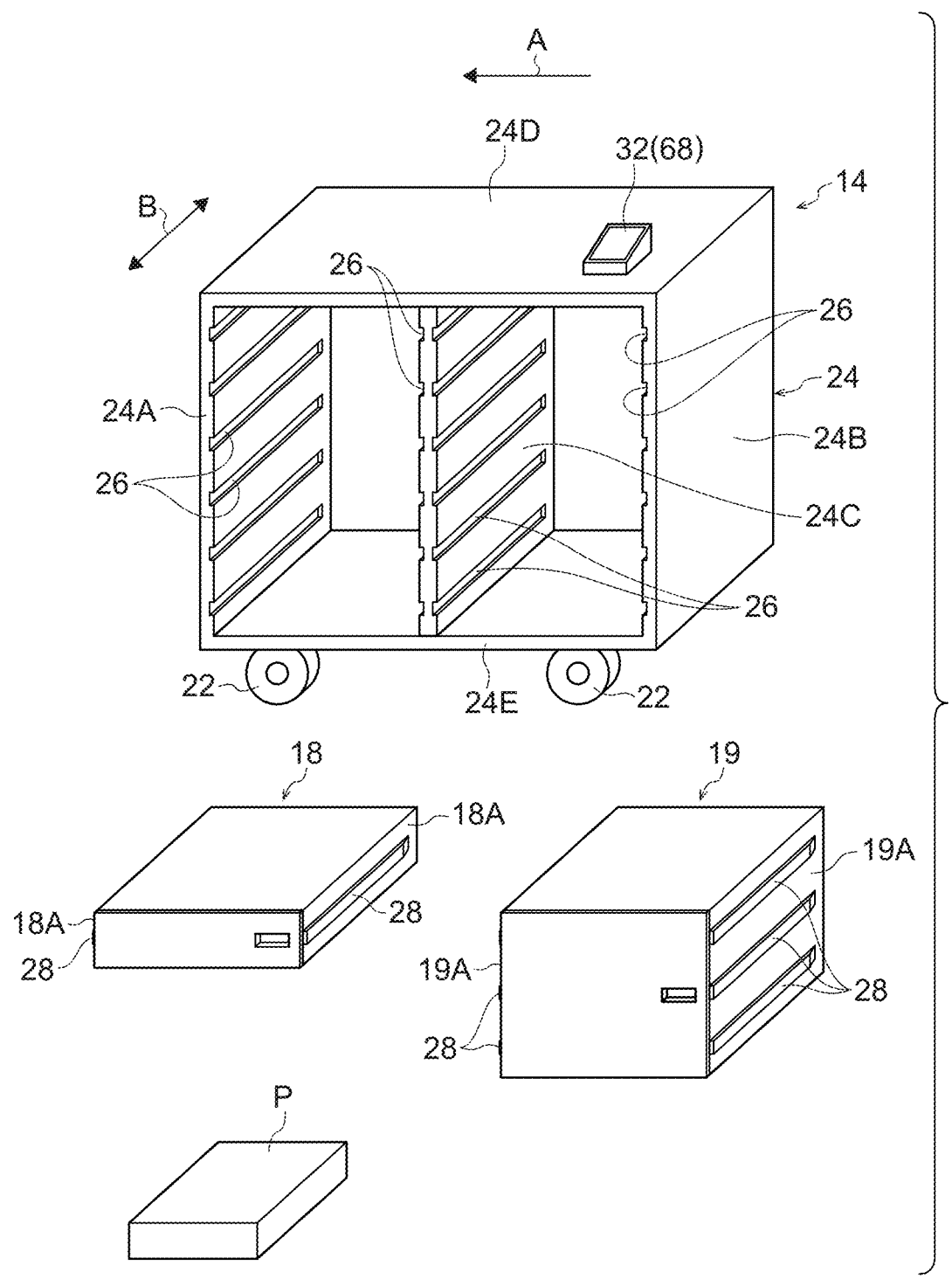
FIG. 3 is an exploded perspective view illustrating an autonomous delivery box according to an exemplary embodiment.

FIG. 3 is an exploded perspective view illustrating the structure of the autonomous home delivery pallet 14. In the present exemplary embodiment, the external profile of the autonomous home delivery pallet 14 is formed by a retainer frame 24 formed with its length direction corresponding to a direction of progress of the autonomous home delivery pallet 14 (the arrow A direction).

The retainer frame 24 includes a front wall 24A at a front side of the retainer frame 24 in the direction of progress of the autonomous home delivery pallet 14, a rear wall 24B at a rear side of the retainer frame 24 in the direction of progress of the autonomous home delivery pallet 14, and a partitioning wall 24C disposed between the front wall 24A and the rear wall 24B. Note that the partitioning wall 24C is not an essential configuration.

The retainer frame 24 is further includes an upper wall 24D that joins an upper end of the front wall 24A to an upper end of the rear wall 24B, and a lower wall 24E that joins a lower end of the front wall 24A to a lower end of the rear wall 24B.

The upper wall 24D is provided with an unlock code reader 32 of a lock device 68 configured by a non-illustrated electronic lock, described later. The code reader 32 reads an unlock code for the lock device 68 that has been presented by the user. The unlock code is, for example, a two-dimensional code displayed on a display screen of the user terminal 16. This two-dimensional code is obtained by encoding unique information, and may be configured by a barcode, a QR code (registered trademark), or the like. A lower face side of the lower wall 24E is provided with non-illustrated axle bearings. The axle bearings support axles. The wheels 22 are rotatably supported by these axles.

Moreover, the mutually opposing front wall 24A and partitioning wall 24C and the mutually opposing partitioning wall 24C and rear wall 24B are formed with grooves 26 on their respective opposing faces. The grooves 26 are formed at predetermined intervals in a height direction of the autonomous home delivery pallet 14 and run along a width direction of the autonomous home delivery pallet 14 (arrow B direction).

The home delivery boxes 18, 19 are box shaped, and are slidable relative to the retainer frame 24 along the width direction of the autonomous home delivery pallet 14. Ribs 28 that engage with the grooves 26 formed in the retainer frame 24 are formed at outer faces on both side walls 18A, 19A of each of the home delivery boxes 18, 19. The ribs 28 of the home delivery boxes 18, 19 can be slid along the grooves 26 of the retainer frame 24 in order to fit the home delivery boxes 18, 19 in the retainer frame 24.

Note that plural of the ribs 28 may be formed corresponding to a height dimension of the home delivery boxes 18, 19. The grooves 26 are configured by elongated grooves opening toward the side of the viewer in the drawings. Movement of the home delivery boxes 18, 19 is restricted when the ribs 28 abut back walls of the respective grooves 26. In this state, the home delivery boxes 18, 19 are fixed to the retainer frame 24 using non-illustrated fixing devices.

As described above, the plural home delivery boxes 18, 19 are retained inside the retainer frame 24 of the autonomous home delivery pallet 14, and the home delivery boxes 18, 19 are loaded and unloaded with respect to the retainer frame 24.

Note that the home delivery boxes 18 and the home delivery boxes 19 described above differ from each other in size. Packages come in a variety of sizes, and packages that are too large to be housed inside the home delivery boxes 18 are housed inside the home delivery boxes 19. On the other hand, in a case in which the home delivery boxes 18 are large enough to house all of plural packages, it would be inefficient and a waste of the space available inside the home delivery boxes 19 to house such packages in the home delivery boxes 19. Accordingly, in the present exemplary embodiment, the type of home delivery boxes 18, 19 fitted into the retainer frame 24 may be varied according to the size of the packages. Obviously, the home delivery boxes 18 and the home delivery boxes 19 may have the same size as each other.

As illustrated in FIG. 2, front faces of the home delivery boxes 18, 19 are respectively provided with doors 18B, 19B to open up the interior of the home delivery boxes 18, 19. Each of the doors 18B, 19B is provided with a non-illustrated hinge on a side wall 18A, 19A side corresponding to a front end side in the direction of progress of the autonomous home delivery pallet 14 (arrow A direction). The respective doors 18B, 19B are opened and closed about the corresponding hinges. Note that the hinges may alternatively be provided at an upper end side or a lower end side of the home delivery boxes 18, 19.

The doors 18B, 19B are provided with the lock device 68 described above (see FIG. 6). The lock device 68 locks and unlocks the doors 18B, 19B. The doors 18B, 19B can be opened and closed when electronic locking has been unlocked by the lock device 68.

The respective doors 18B, 19B are provided with non-illustrated torsion springs, the torsion springs being attached so as to generate a force to bias the doors 18B, 19B in an opening direction when the doors 18B, 19B are in a closed state. Accordingly, when the electronic locking is unlocked by the lock device 68, the force of the torsion spring biases the door of the home delivery box housing the corresponding package in the opening direction. This allows the user to identify the home delivery box in which the package P is housed. Note that the torsion springs are not an essential configuration, and setting may be made such that the user opens the door of a designated home delivery box.

Figure 4:
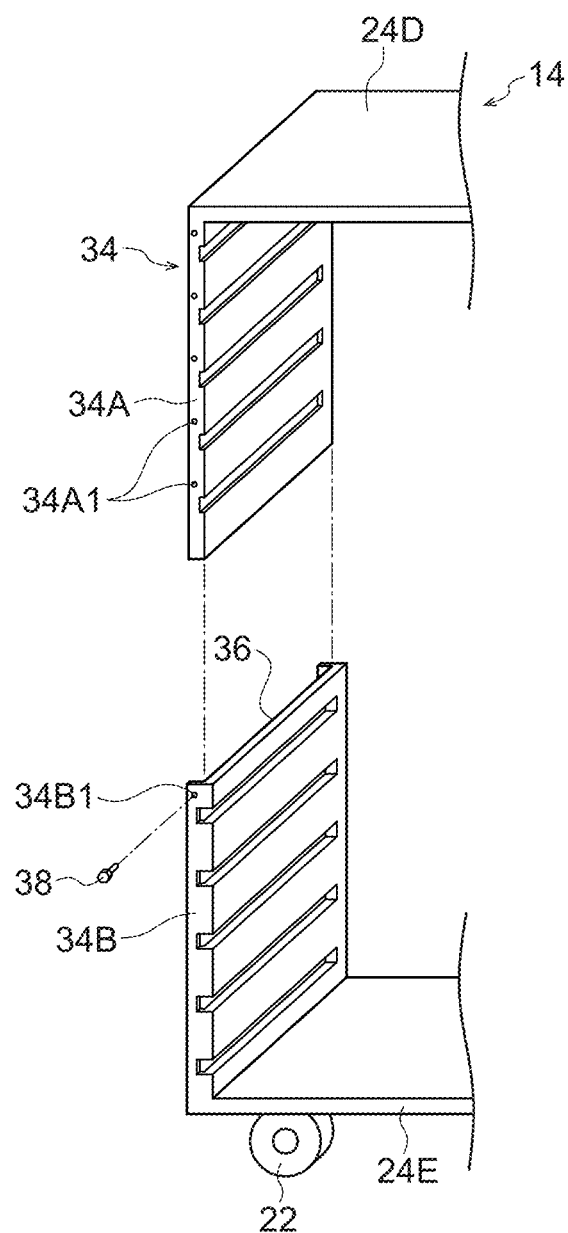
FIG. 4 is an exploded perspective view illustrating a modified example of an autonomous delivery box according to an exemplary embodiment.

Moreover, the autonomous home delivery pallet 14 may be configured in advance with an adjustable height direction dimension. FIG. 4 is an exploded perspective view illustrating the front walls 34A and 34B of the autonomous home delivery pallet 14, each being part of a vertical wall 34 configured with an adjustable height direction dimension. Although omitted from illustration in FIG. 4, the partitioning wall 24C and the rear wall 24B illustrated in FIG. 3 that configure other vertical walls 34 are configured substantially similarly to the front walls 34A and 34B.

As illustrated in FIG. 4, the vertical wall 34 of the autonomous home delivery pallet 14 is configured including an upper wall 34A and a lower wall 34B. The upper wall 34A is capable of sliding along the height direction relative to the lower wall 34B. In plan view, the lower wall 34B is formed in a substantially a U-shape so as to form an opening 36 at the outer side of the autonomous home delivery pallet 14 in the direction of progress of the autonomous home delivery pallet 14. The upper wall 34A is capable of being inserted into the opening 36.

End portions on both sides of the lower wall 34B are each formed with a hole 34B1, and end portions on both sides of the upper wall 34A are each formed with plural holes 34A1 arranged along the height direction. When the upper wall 34A has been positioned with respect to the lower wall 34B, the upper wall 34A is fixed to the lower wall 34B using bolts 38 passed through the holes 34B1 and the holes 34A1, thereby defining the height direction dimension of the autonomous home delivery pallet 14.

Although not illustrated in the drawings, the autonomous home delivery pallet 14 may also be configured with an adjustable length direction dimension along the direction of progress.

As described above, in the above configuration, the plural home delivery boxes 18, 19 are loaded and unloaded with respect to the interior of the retainer frame 24 of the autonomous home delivery pallet 14. The material employed for the home delivery boxes 18, 19 may therefore be varied depending on the package. For example, a single autonomous home delivery pallet 14 may be loaded with both metal home delivery boxes and resin home delivery boxes, and the home delivery boxes employed may be formed from thermally insulating materials or may be provided with internal shock absorbing material.

Note that it is not essential for the home delivery boxes 18, 19 to be loadable and unloadable with respect to the autonomous home delivery pallet 14.

Delivery System Configuration

The server 20 at the dispatch center 12, the autonomous home delivery pallet 14, and the user terminal 16 configuring the delivery system 10 in which the autonomous home delivery pallet 14 is employed will now be described in sequence.

Hardware Configuration of Server

Figure 5:
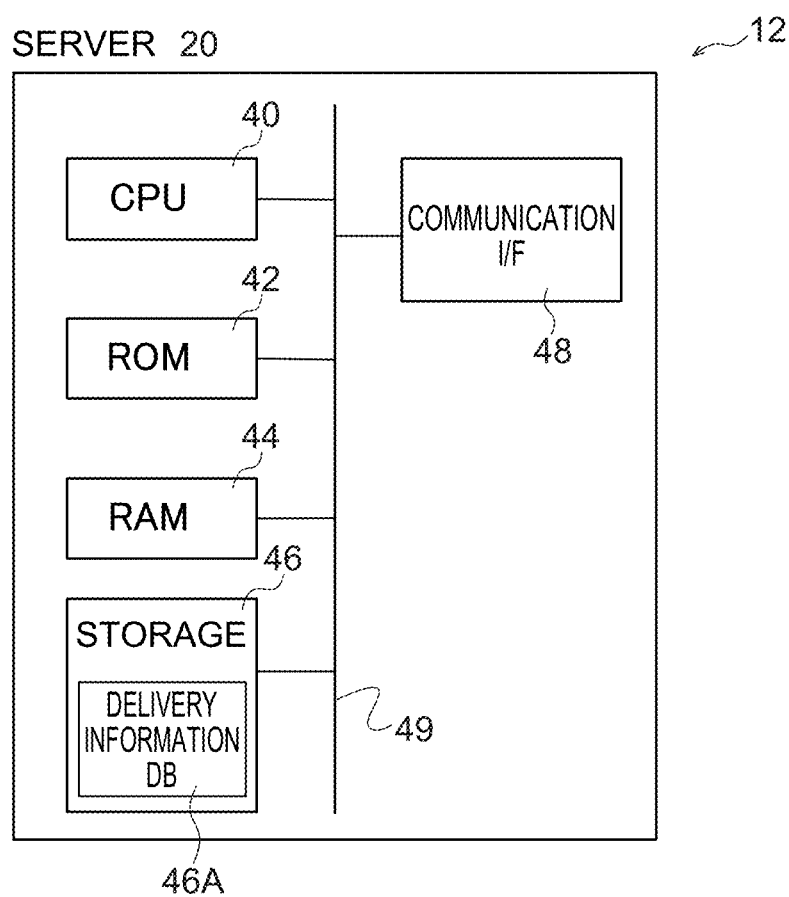
FIG. 5 is a block diagram illustrating a hardware configuration of a server at a dispatch center configuring part of a delivery system according to an exemplary embodiment.

Explanation follows regarding a hardware configuration included in the server 20, with reference to FIG. 5. The server 20 is configured including a central processing unit (CPU) 40, read only memory (ROM) 42, random access memory (RAM) 44, storage 46, and a communication interface (I/F) 48. The CPU 40, the ROM 42, the RAM 44, and the communication interface 48 are connected together so as to communicate with each other through a bus 49.

The CPU 40 serves as a control section, and is a central processing unit that executes various programs and controls various sections. Namely, the CPU 40 reads a program from the ROM 42 or the storage 46, and executes the program using the RAM 44 as a workspace. The CPU 40 controls the various configurations described above and performs various arithmetic processing according to the program recorded in the ROM 42 or the storage 46.

The ROM 42 holds various programs and various data. The RAM 44 functions as a workspace to temporarily store programs and data. The storage 46 serves as a storage section, and is configured by a hard disk drive (HDD) or a solid state drive (SSD) in which various programs including an operating system, as well as various data, are held.

In the present exemplary embodiment, the storage 46 holds a delivery information database (DB) 46A in which delivery information relating to packages P for delivery by the autonomous home delivery pallet 14 (see FIG. 2) is stored. Note that the delivery information includes at least identification numbers of the home delivery boxes 18 and identification numbers of the packages P housed in the respective home delivery boxes 18, stored in association with each other. The stored delivery information may also include IDs of the users (recipients) of the packages P, delivery destination addresses, user contact addresses, requested delivery dates and times, and the like.

The communication interface 48 is an interface for communicating with other devices including the autonomous home delivery pallet 14 and the user terminal 16 illustrated in FIG. 1, and may employ a communication protocol such as Ethernet (registered trademark), LTE, FDDI, Wi-Fi (registered trademark), or the like.

Functional Configuration of Server

Figure 8:
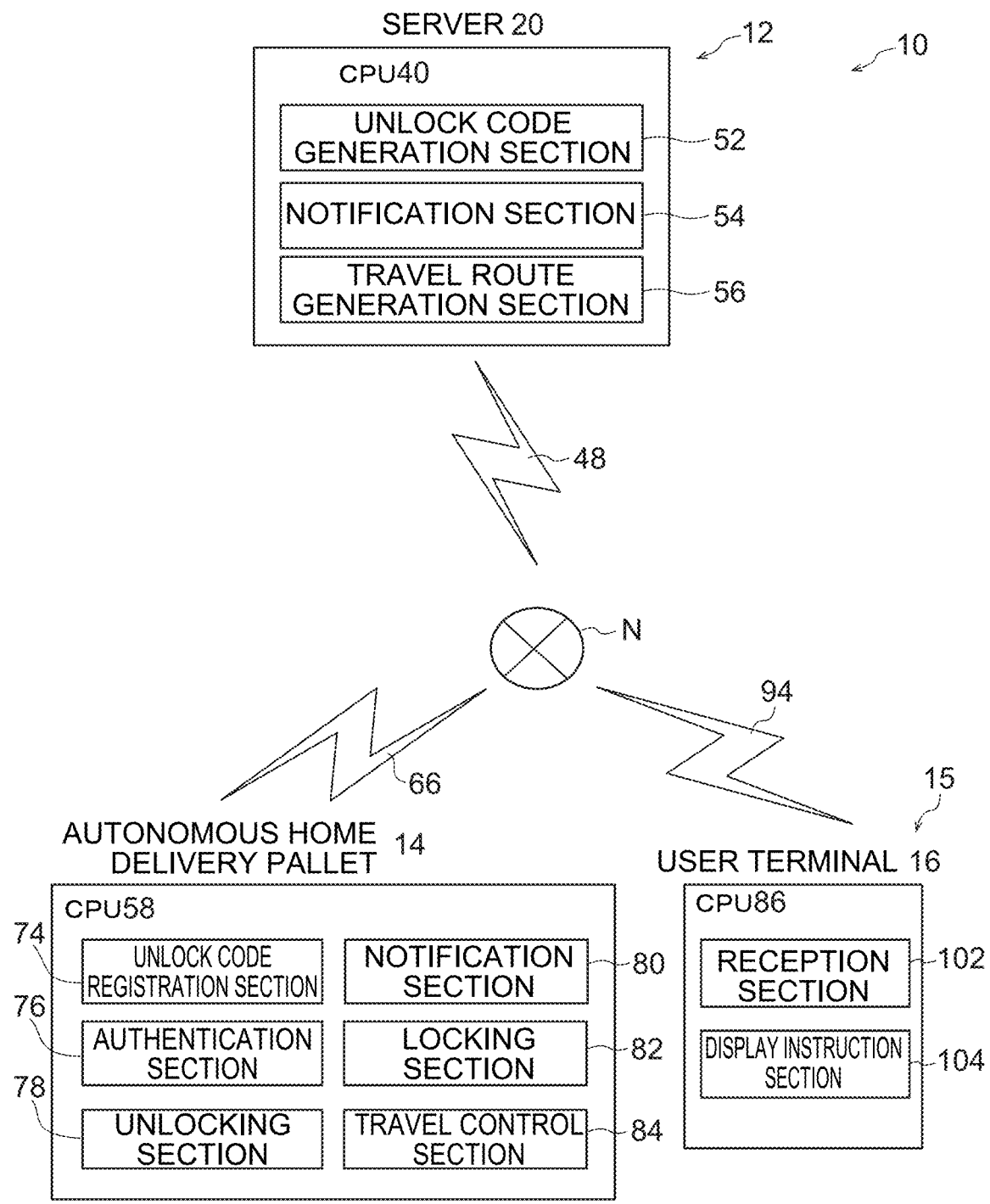
FIG. 8 is a block diagram illustrating functional configurations of a server, an autonomous delivery box, and a user terminal configuring a delivery system according to an exemplary embodiment.

Next, explanation follows regarding an example of functional configuration of the CPU 40. As illustrated in FIG. 8, the CPU 40 includes an unlock code generation section 52, a notification section 54, and a travel route generation section 56. These functional configurations are implemented by the CPU 40 illustrated in FIG. 5 reading and executing an execution program stored in the ROM 42 or the storage 46.

The unlock code generation section 52 generates an unlock code such as a bar code or a QR code (registered trademark) used to unlock the lock device 68 (see FIG. 6) for the home delivery boxes 18 retained in the autonomous home delivery pallet 14. Note that in the present exemplary embodiment, in a case in which the package P contains a high-value item, an authentication level required in order to unlock the corresponding home delivery box 18 is set higher, for example by setting dual-stage unlock codes.

The notification section 54 notifies the autonomous home delivery pallet 14 and the user terminal 16 of the generated unlock code. Specifically, the notification section 54 acquires from the delivery information DB associated information including the identification number of the corresponding home delivery box 18, the identification number of the package P housed in this home delivery box 18, and the user ID and contact address of the user who receives the package P. The notification section 54 then notifies the autonomous home delivery pallet 14 and the user terminal 16 of the generated unlock code via the communication interface 48.

In a case in which the notification section 54 has received unlock information to the effect that the autonomous home delivery pallet 14 has been unlocked, the notification section 54 notifies the user terminal 16 via the communication interface 48 that the autonomous home delivery pallet 14 has been unlocked.

Moreover, in a case in which the notification section 54 has received locking information to the effect that the autonomous home delivery pallet 14 has been locked, the notification section 54 notifies the user terminal 16 via the communication interface 48 that the autonomous home delivery pallet 14 has been locked. Namely, notification is made that the package P has been delivered to the user.

The travel route generation section 56 generates a travel route based on map information. Note that in the present exemplary embodiment, the travel route is modified according to delivery information relating to the packages P based on the delivery information database (DB) 46A held in the storage 46.

For packages for standard delivery, a basic travel route is set as a round trip from the dispatch center 12 configuring a dispatch origin to the user home configuring the delivery destination and back again, taking into consideration factors such as the ease of travel for the autonomous home delivery pallet 14, the distance, and journey time. However, depending on the package type, the basic travel route may be determined inappropriate as a travel route.

For example, in a case in which the package contains frozen goods, an increase in the temperature of the package is a concern, and therefore sunlit areas and shaded areas may be detected based on the current position of the sun in order to modify the travel route to a travel route that avoids travel through the detected sunlit areas and travels instead through the shaded areas.

Alternatively, in a case in which a package contains a high-value item, the travel route may be modified so as to avoid travel routes that travel through areas such as busy commercial districts that are likely to be more prone to crime, and instead travel through areas such as school zones and residential streets that are likely to be less prone to crime.

Moreover, in a case in which the package contains food, the travel route may be changed so as to avoid travel routes that travel through areas such as parks in which there are likely to be more wild birds and animals, and instead travel through areas such as residential streets in which there are likely to be fewer wild birds and animals.

Hardware Configuration of Autonomous Home Delivery Pallet

Figure 6:
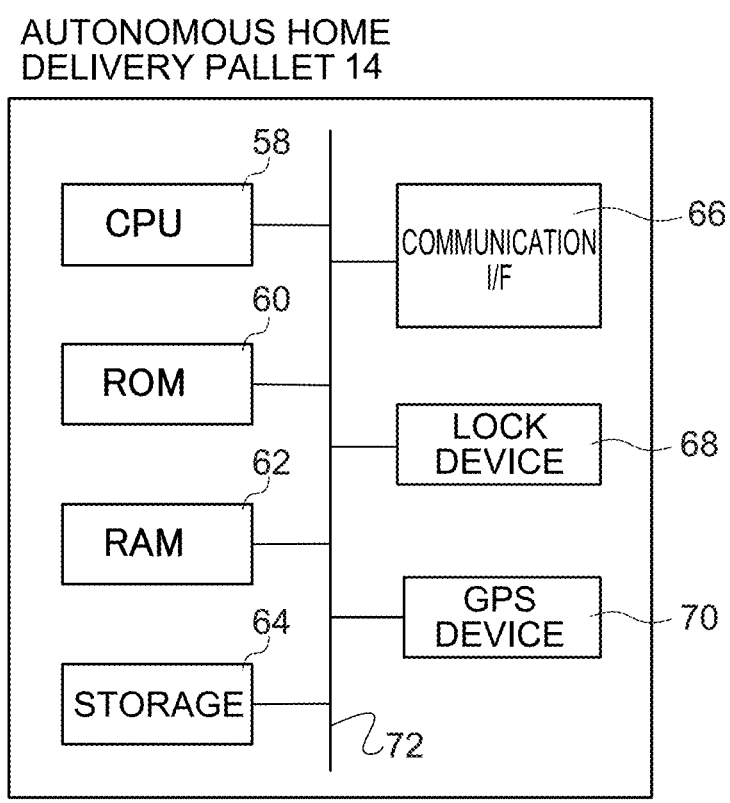
FIG. 6 is a block diagram illustrating a hardware configuration of an autonomous delivery box configuring part of a delivery system according to an exemplary embodiment.

Explanation follows regarding hardware configuration included in the autonomous home delivery pallet 14, with reference to FIG. 6. The autonomous home delivery pallet 14 includes a CPU 58, ROM 60, RAM 62, storage 64, a communication interface 66, the lock device 68, and a global positioning system (GPS) device 70. These respective configurations are connected together through a bus 72 so as to communicate with each other.

The CPU 58 serves as a control section, and is a central processing unit that reads a program from the ROM 60 or the storage 64 and executes the program using the RAM 62 as a workspace.

The ROM 60 holds various programs and various data. The RAM 62 functions as a workspace to temporarily store programs and data. The storage 64 is configured by a HDD, a SSD, or flash memory in which various programs including an operating system, as well as various data, are held.

The communication interface 66 is an interface for communicating with other devices including the server 20 and the user terminal 16 illustrated in FIG. 1, and may employ a protocol such as Ethernet (registered trademark), LTE, FDDI, Wi-Fi (registered trademark), or the like.

The lock device 68 is configured by an electronic lock, and is configured by a non-illustrated lock mechanism employing a solenoid or the like. The lock device 68 locks and unlocks each of the respective home delivery boxes 18 retained in the autonomous home delivery pallet 14, and reads the unlock codes using the code reader 32 (see FIG. 2), this configuring part of the lock device 68.

The GPS device 70 acquires a current position of the autonomous home delivery pallet 14.

Functional Configuration of Autonomous Home Delivery Pallet

Next, explanation follows regarding an example of functional configuration of the CPU 58. As illustrated in FIG. 8, the CPU 58 includes an unlock code registration section 74, an authentication section 76, an unlocking section 78, a notification section 80, a locking section 82, and a travel control section 84. These functional configurations are implemented by the CPU 58 illustrated in FIG. 6 reading and executing an execution program stored in the ROM 60 or the storage 64.

The unlock code registration section 74 registers (stores) the unlock code notified from the server 20 in the ROM 60 or the storage 64.

The authentication section 76 performs an authentication operation as to whether or not the unlock code presented by the user matches the unlock code registered in the ROM 60 or the storage 64. Specifically, when the code reader 32 of the lock device 68 reads the two-dimensional code, the authentication section 76 performs an authentication operation as to whether or not the two-dimensional code read by the code reader 32 (the unlock code presented by the user) matches the registered unlock code.

The unlocking section 78 unlocks (the electronic lock of) the home delivery box 18 in which the package P (see FIG. 2) to be handed over to the user is housed in a case in which the authentication section 76 has confirmed that the unlock code matches the unlock code registered in the ROM 60 or the storage 64.

When the home delivery box 18 has been unlocked using the unlock code, the notification section 80 notifies the server 20 that the home delivery box 18 has been unlocked via the communication interface 66.

The locking section 82 locks the electronic lock after the door 18B of the home delivery box 18 has been closed.

When the home delivery box 18 has been locked, the notification section 80 notifies the server 20 and the user terminal 16 that the home delivery box 18 has been locked via the communication interface 66. This corresponds to what is referred to as handover confirmation notification.

Note that the notification section 80 also notifies the server 20 of position information for the autonomous home delivery pallet 14 as acquired by the GPS device 70. The notification section 80 also notifies the server 20 of the fact when the autonomous home delivery pallet 14 is in a travel-disabled state, such as cases in which the autonomous home delivery pallet 14 has toppled over, or the home delivery box 18 has been damaged during a theft.

The travel control section 84 determines whether or not the autonomous home delivery pallet 14 is permitted to travel. In a case in which the travel control section 84 determines the autonomous home delivery pallet 14 to have satisfied travel-permitting conditions, the travel control section 84 allows the autonomous home delivery pallet 14 to travel according to the travel route generated by the travel route generation section 56. On the other hand, in a case in which the travel control section 84 determines the autonomous home delivery pallet 14 not to have satisfied the travel-permitting conditions, the travel control section 84 does not allow the autonomous home delivery pallet 14 to travel. Namely, a stationary state of the autonomous home delivery pallet 14 is maintained.

For example, the travel-permitting conditions of the present exemplary embodiment include the doors 18B of the home delivery boxes 18 being locked (closed). When the doors 18B of the home delivery boxes 18 are locked, the autonomous home delivery pallet 14 is permitted to travel, and when the doors 18B of the home delivery boxes 18 are not locked, the autonomous home delivery pallet 14 does not travel.

In the travel-permitting conditions of the present exemplary embodiment, the autonomous home delivery pallet 14 is permitted to travel on completion of a handover procedure in which the user receives the package, or on completion of handover of all the packages due to be received by the user. Accordingly, the autonomous home delivery pallet 14 does not travel in a case in which the user handover procedure has not been completed, or in a case in which handover of all the packages to the user has not been completed. Namely, in the present exemplary embodiment, the autonomous home delivery pallet 14 does not travel until the travel-permitting conditions have been satisfied.

Hardware Configuration of User Terminal

Figure 7:
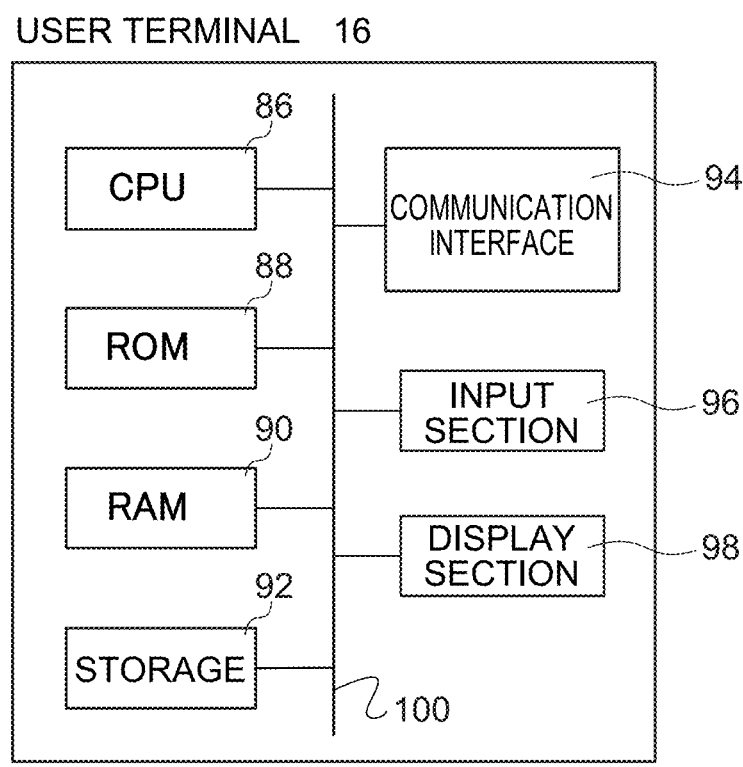
FIG. 7 is a block diagram illustrating a hardware configuration of a user terminal configuring part of a delivery system according to an exemplary embodiment.

Explanation follows regarding a hardware configuration included in the user terminal 16, with reference to FIG. 7. The user terminal 16 includes a CPU 86, ROM 88, RAM 90, storage 92, a communication interface 94, an input section 96, and a display section 98. Each of these configurations are connected together so as to communicate with each other through a bus 100.

The CPU 86 serves as a control section, and is a central processing unit that reads a program from the ROM 88 or the storage 92 and executes the program using the RAM 90 as a workspace.

The ROM 88 holds various programs and various data. The RAM 90 functions as a workspace to temporarily store programs and data. The storage 92 is configured by a HDD, a SSD, or flash memory in which various programs including an operating system, as well as various data, are held.

The communication interface 94 is an interface for communicating with other devices including the server 20 and the autonomous home delivery pallet 14 illustrated in FIG. 1, and may employ a communication protocol such as Ethernet (registered trademark), FDDI, Wi-Fi (registered trademark), or the like.

The input section 96 receives operational input from a user. The input section 96 includes, for example, a keyboard or touch panel, a microphone, a camera, and the like. The display section 98 displays information and so on on-screen.

The display section 98 is, for example, configured by a display. Note that the input section 96 and the display section 98 may be integrated together as a touch panel.

Note that a generic smartphone, tablet, or the like may be employed as the user terminal 16.

Functional Configuration of User Terminal

Next, explanation follows regarding an example of functional configuration of the CPU 86. As illustrated in FIG. 8, the CPU 86 includes a reception section 102 and a display instruction section 104. These functional configurations are implemented by the CPU 86 illustrated in FIG. 7 reading and executing an execution program stored in the ROM 88 or the storage 92.

The reception section 102 receives notification of the unlock code transmitted from the server 20. The reception section 102 also receives various display information generated by the server 20.

In a case in which notification that the home delivery box 18 has been unlocked has been received, the reception section 102 of the user terminal 16 of the user, this being the recipient of the package P, receives notification that the home delivery box 18 has been unlocked.

In a case in which notification that the home delivery box 18 has been locked has been received, the reception section 102 of the user terminal 16 receives notification that the home delivery box 18 has been locked. This is what is referred to as receipt confirmation notification.

The display instruction section 104 displays the unlock code on a display screen of the user terminal 16 in response to user operation of the user terminal 16. The display instruction section 104 also displays various display information generated by the server 20 on the display screen of the user terminal 16 in response to user operation of the user terminal 16.

Flow of Delivery System

Figure 9:
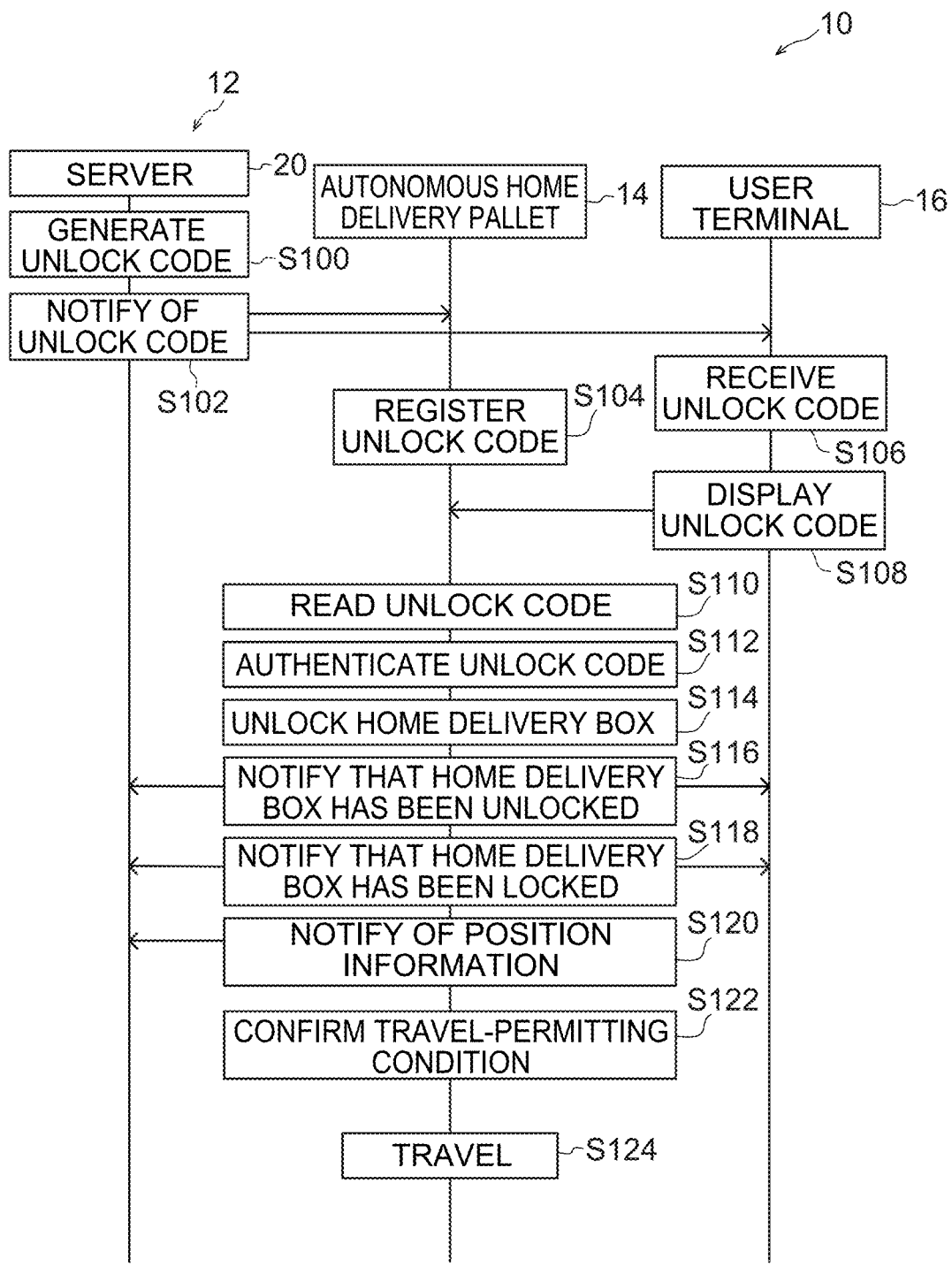
FIG. 9 is a sequence chart illustrating an example of a flow of processing performed by a delivery system according to an exemplary embodiment.

Next, explanation follows regarding a flow of the delivery system 10 illustrated in FIG. 9, with reference to FIG. 5 to FIG. 7. Note that FIG. 9 is a sequence chart illustrating an example of a flow of processing performed by the delivery system 10.

As illustrated in FIG. 9, first, when a package P is housed in a home delivery box 18 of the autonomous home delivery pallet 14 (see FIG. 2) at the dispatch center 12, at step S100, the CPU 40 of the server 20 generates an unlock code corresponding to this home delivery box 18 based on an input from an external device connected to the server 20.

Next, at step S102, based on information in the delivery information database 46A (see FIG. 5), the CPU 40 of the server 20 identifies information relating to the autonomous home delivery pallet 14 and a contact address of the user terminal 16 of the recipient (user) of the package housed in the autonomous home delivery pallet 14 that are to be notified of the unlock code. The CPU 40 then notifies the user terminal 16 and the autonomous home delivery pallet 14 of the unlock code (transmits the unlock code).

On receipt of notification of the unlock code from the server 20, the CPU 58 of the autonomous home delivery pallet 14 registers (stores) the unlock code in the ROM 60 or the storage 64 at step S104.

At step S106, the CPU 86 of the user terminal 16 receives the unlock code notified from the server 20.

Then at step S108, the CPU 86 of the user terminal 16 displays the unlock code on the display screen of the user terminal 16 in response to user operation of the user terminal 16. For example, the user performs an operation to initiate a software application to unlock the lock device 68 of the home delivery box 18, in response to which the unlock code configured by a QR code (registered trademark) or the like is displayed on the display screen of the user terminal 16.

Next, when the user presents the display screen of the user terminal 16 to the unlock code reader 32 (see FIG. 2) for unlocking the lock device 68, at step S110, the CPU 58 of the autonomous home delivery pallet 14 reads the unlock code.

Then at step S112, the CPU 58 of the autonomous home delivery pallet 14 authenticates the unlock code. At step S114, the CPU 58 unlocks (the lock device 68 for) the identified home delivery box 18 in a case in which the registered unlock code matches the unlock code read by the code reader 32. The door 18B of this home delivery box 18 opens as a result.

At step S116, the CPU 58 notifies the server 20 and the user terminal 16 that the home delivery box 18 has been unlocked. In this manner, when the home delivery box 18 is unlocked, the user is able to remove the package P from inside the home delivery box 18. When the user closes the door 18B, the electronic locking is locked.

Next, at step S118, the CPU 58 notifies the server 20 and the user terminal 16 that the home delivery box 18 has been locked.

At step S120, the CPU 58 notifies the server 20 of the position information of the autonomous home delivery pallet 14 as acquired by the GPS device 70.

At step S122, the CPU 58 confirms that the travel-permitting conditions of the autonomous home delivery pallet 14 has been satisfied (that the home delivery box 18 has been locked). Note that step S122, as well as step S124 below, are described separately in more detail with reference to the flowchart illustrated in FIG. 10.

At step S124, the CPU 58 allows the autonomous home delivery pallet 14 to travel.

Figure 10:
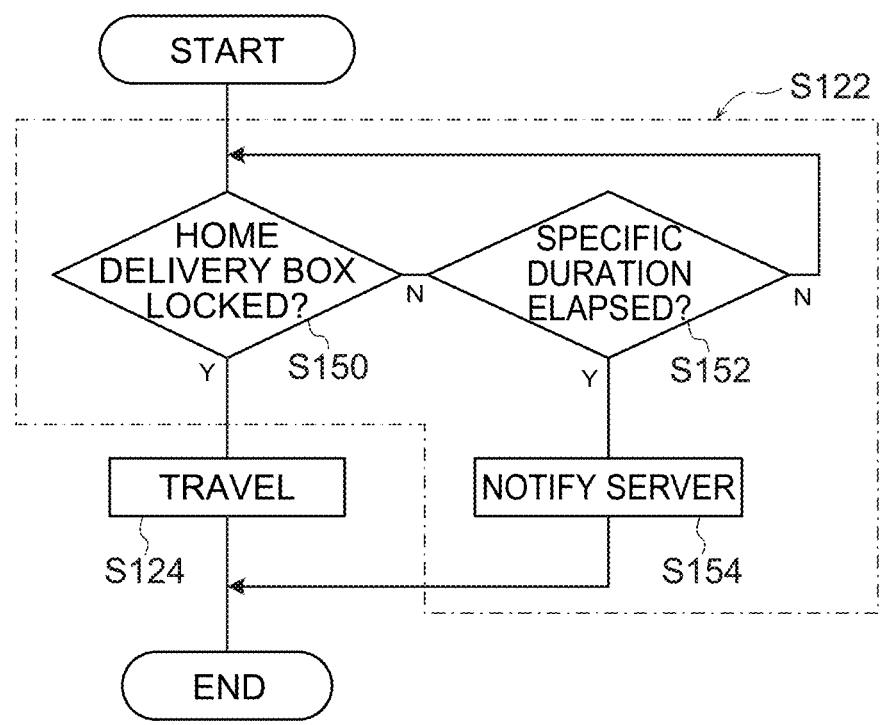
FIG. 10 is a flowchart illustrating an example of a flow of some of the processing of the sequence chart illustrated in FIG. 9.

FIG. 10 is a flowchart illustrating an example of a flow of processing relating to confirmation of the travel-permitting condition of the autonomous home delivery pallet 14 at step S122 in FIG. 9.

As illustrated in FIG. 10, at step S150, the CPU 58 of the autonomous home delivery pallet 14 determines whether or not the home delivery box 18 has been locked, this being the travel-permitting condition.

In a case in which the CPU 58 determines that the home delivery box 18 has been locked at step S150 (step S150: Y), processing transitions to step S124. At step S124, the CPU 58 allows the autonomous home delivery pallet 14 to travel.

On the other hand, in a case in which the CPU 58 determines that the home delivery box 18 has not been locked at step S150 (step S150: N), processing transitions to step S152. At step S152, the CPU 58 determines whether or not a preset specific duration has elapsed.

In a case in which the CPU 58 determines that the specific duration has elapsed at step S152 (step S152: Y), processing transitions to step S154. At step S154, the CPU 58 notifies the server 20. Since the autonomous home delivery pallet 14 does not travel in this state, the server 20 is notified in order to resolve the situation.

On the other hand, in a case in which the CPU 58 determines that the specific duration has not yet elapsed at step S152 (step S152: N), processing transitions to step S150, and the processing is continued until the home delivery box 18 has been locked.

Note that although the home delivery box 18 having being locked is given as an example of a travel-permitting condition, other examples of travel-permitting conditions include the completion of a handover procedure by the user who receives the package P, or the completion of handover of all the packages P by the user. Setting may be made to incorporate confirmation of such travel-permitting conditions.

Generation of Travel Route

Figure 11:
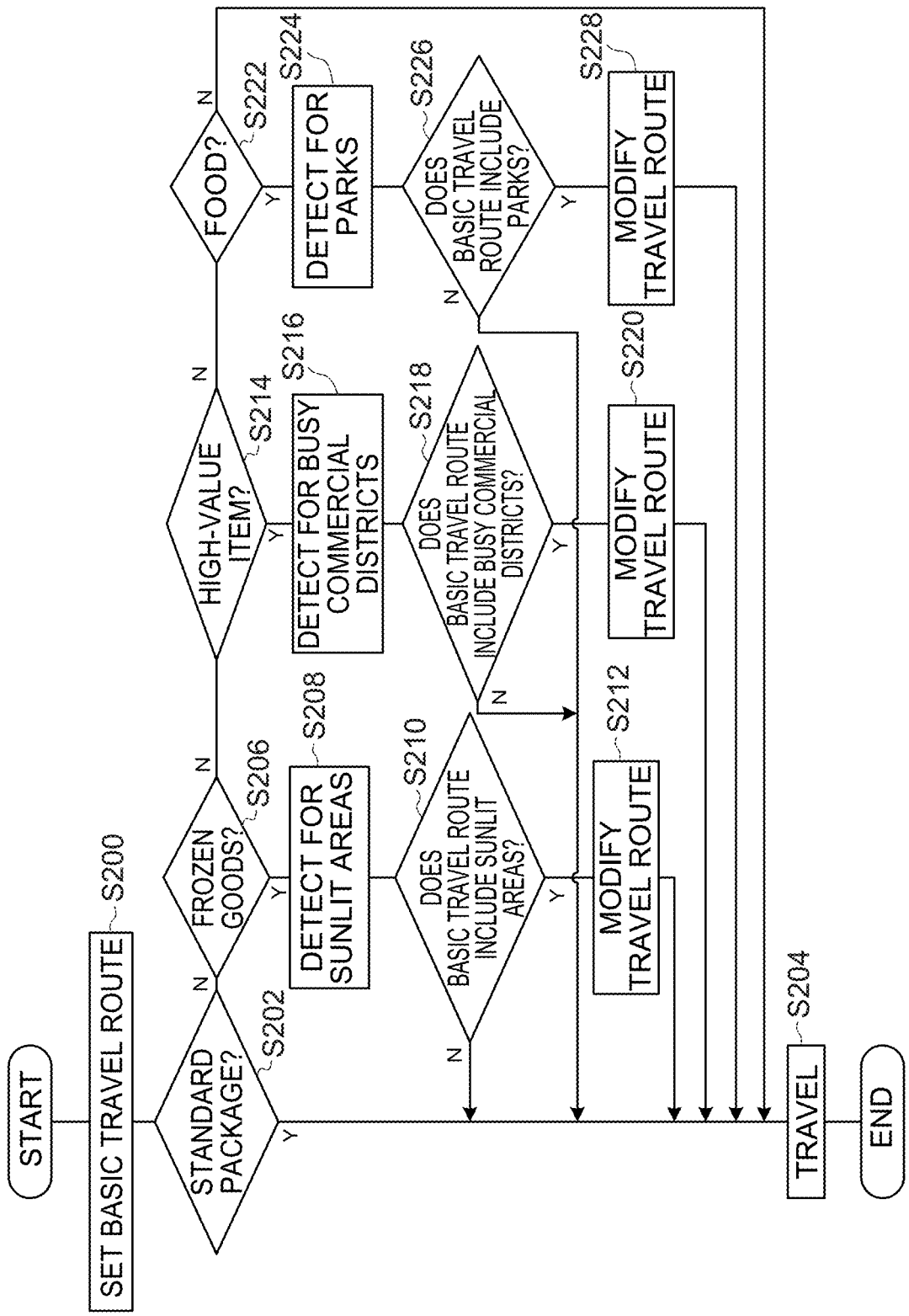
FIG. 11 is a flowchart illustrating an example of a flow of travel route generation performed by a delivery system according to an exemplary embodiment.

Next, explanation follows regarding generation of the travel route, with reference to FIG. 5 to FIG. 7. FIG. 11 is a flowchart illustrating an example of a flow of travel route generation for the autonomous home delivery pallet 14.

As illustrated in FIG. 11, first at step S200, the CPU 40 of the server 20 uses the travel route generation section 56 to generate, based on map data, a basic travel route on which the autonomous home delivery pallet 14 will travel between the dispatch base and the handover location.

Next, at step S202, the CPU 40 checks the delivery information relating to the package P using to the delivery information database (DB) 46A held in the storage 46, and determines whether or not the package P is a standard package.

In a case in which the CPU 40 determines that the package P is a standard package at step S202 (step S202: Y), processing transitions to step S204. At step S204, the CPU

40 allows the autonomous home delivery pallet 14 to travel following the basic travel route.

On the other hand, in a case in which the CPU 40 determines that the package P is not a standard package at step S202 (step S202: N), processing transitions to step S206. At step S206, the CPU 40 determines whether or not the package P contains frozen goods (encompassing refrigerated goods).

In a case in which the CPU 40 determines that the package P contains frozen goods at step S206 (step S206: Y), processing transitions to step S208. At step S208, the CPU 40 detects for sunlit areas based on the current position of the sun.

Next, at step S210, the CPU 40 determines whether or not the basic travel route includes sunlit areas.

In a case in which the CPU 40 determines that the basic travel route does not include sunlit areas at step S210 (step S210: N), processing transitions to step S204. At step S204, the CPU 40 causes the autonomous home delivery pallet 14 to travel following the basic travel route.

On the other hand, in a case in which the CPU 40 determines that the basic travel route includes sunlit areas at step S210 (step S210: YES), processing transitions to step S212. At step S212, the CPU 40 modifies the basic travel route to a travel route traveling through shaded areas. The CPU 40 then transitions to the processing of step S204. At step S204, the CPU 40 causes the autonomous home delivery pallet 14 to travel following the modified travel route so as to travel through shaded areas.

In a case in which the CPU 40 determines that the package P does not contains frozen goods at step S206 (step S206: N), processing transitions to step S214. At step S214, the CPU 40 determines whether or not the package P contains a high-value item.

In a case in which the CPU 40 determines that the package P contains a high-value item at step S214 (step S214: Y), processing transitions to step S216. At step S216, the CPU 40 detects for busy commercial districts.

Next, at step S218, the CPU 40 determines whether or not the basic travel route includes busy commercial districts.

In a case in which the CPU 40 determines that the basic travel route does not include any busy commercial districts at step S218 (step S218: N), processing transitions to step S204. At step S204, the CPU 40 causes the autonomous home delivery pallet 14 to travel following the basic travel route.

On the other hand, in a case in which the CPU 40 determines that the basic travel route includes busy commercial districts at step S218 (step S218: Y), processing transitions to step S220. At step S220, the CPU 40 modifies the basic travel route to a travel route traveling through areas such as school zones and residential streets that are comparatively less prone to crime. The CPU 40 then transitions to the processing of step S204. At step S204, the CPU 40 causes the autonomous home delivery pallet 14 to travel following the modified travel route so as to travel through areas that are likely to be less prone to crime.

In a case in which the CPU 40 determines that the package P does not contain a high-value item at step S214 (step S214: NO), processing transitions to step S222. At step S222, the CPU 40 determines whether or not the package P contains food.

In a case in which the CPU 40 determines that the package P contains food at step S222 (step S222: Y), processing transitions to step S224. At step S224, the CPU 40 detects for areas such as parks in which there are likely to be more wild birds and animals.

Next, at step S226 the CPU 40 determines whether or not the basic travel route includes areas such as parks in which there are likely to be more wild birds and animals.

In a case in which the CPU 40 determines that the basic travel route does not include areas such as parks in which there are likely to be more wild birds and animals at step S226 (step S226: N), processing transitions to step S204. At step S204, the CPU 40 causes the autonomous home delivery pallet 14 to travel following the basic travel route.

On the other hand, in a case in which the CPU 40 determines that the basic travel route includes areas such as parks in which there are likely to be more wild birds and animals at step S226 (step S226: Y), processing transitions to step S228. At step S228, the CPU 40 modifies the basic travel route to a travel route traveling through areas such as residential streets in which there are likely to be fewer wild birds and animals. The CPU 40 then transitions to the processing of step S204. At step S204, the CPU 40 causes the autonomous home delivery pallet 14 to travel following the modified travel route so as to travel through areas in which there are likely to be fewer wild birds and animals.

Note that the flowcharts described above are merely examples, and the flow of travel route generation is not limited thereto. For example, the sequence in which step S206, step S214, and step S222 are performed is not limited to that described above.

Operation and Advantageous Effects of
Autonomous Home Delivery Box

As illustrated in FIG. 1, the autonomous home delivery pallet 14 according to the present exemplary embodiment is configured to travel autonomously between the dispatch center 12 from which the package P (see FIG. 2) is dispatched and the user home 15 at which the package P is handed over. As illustrated in FIG. 8, the autonomous home delivery pallet 14 includes the authentication section 76 and the travel control section 84.

The autonomous home delivery pallet 14 is provided with the home delivery boxes 18, 19 that are configured to house packages P, and the authentication section 76 is unlocks the respective home delivery boxes 18, 19. The travel control section 84 controls whether or not the autonomous home delivery pallet 14 is permitted to travel, and is set so as to permit the autonomous home delivery pallet 14 to travel when the travel-permitting condition of the autonomous home delivery pallet 14 has been satisfied.

Conversely, in a case in which the autonomous home delivery pallet 14 has not satisfied the travel-permitting condition, the autonomous home delivery pallet 14 is not permitted to travel. In the present exemplary embodiment, the travel-permitting condition of the autonomous home delivery pallet 14 is set such that the autonomous home delivery pallet 14 is not allowed to travel in a case in which the safety of the autonomous home delivery pallet 14 cannot be guaranteed. The autonomous home delivery pallet 14 of the present exemplary embodiment can thus be made to travel in a safe manner.

Note that an example of a travel-permitting condition in the present exemplary embodiment is the doors 18B of the home delivery boxes 18 being closed, regardless of whether or not they have been locked. Namely, the travel control section 84 (see FIG. 8) permits the autonomous home delivery pallet 14 to travel when the doors 18B of the home delivery boxes 18 are closed.

For example, were the autonomous home delivery pallet 14 to travel in a state in which the door 18B was open, there is a possibility that the door 18B might interfere with peripheral portions of the autonomous home delivery pallet 14. Accordingly, the autonomous home delivery pallet 14 is not allowed to travel in a case in which the doors 18B of the home delivery boxes 18 are not closed.

Another example of a travel-permitting condition is the travel control section 84 permitting the autonomous home delivery pallet 14 to travel on completion of a handover procedure to the user who receives the package P. Conversely, in the present exemplary embodiment, in a case in which the user handover procedure is not complete, the autonomous home delivery pallet 14 does not travel. The user can thus be suppressed from forgetting to take the package P. Note that in a case in which plural packages P are to be handed over to a user, the autonomous home delivery pallet 14 is permitted to travel on completion of the handover procedure for all of the plural packages P by the user.

Moreover, in the present exemplary embodiment, the autonomous home delivery pallet 14 is configured to change the authentication level of the authentication section 76 in accordance with the insured value of the package P. This enables the authentication level to be set higher in a case in which the package has a high value than in a case in which the package has a low value, and thus guarantees safety of the package appropriate to the insured value of the package.

In the present exemplary embodiment, the autonomous home delivery pallet 14 is provided with plural of the home delivery boxes 18 so as to be capable of housing plural packages. Each of the home delivery boxes 18 is provided with its own door 18B. This enables a single autonomous home delivery pallet 14 to deliver packages to plural users.

For example, the autonomous home delivery pallet 14 is thereby useful for making deliveries to a multi-unit housing complex or the like. For example, in a case in which plural users residing in the multi-unit housing complex have requested deliveries in different time windows, the autonomous home delivery pallet 14 can be made to wait inside the multi-unit housing complex until delivery has been completed for all the users within the multi-unit housing complex.

As illustrated in FIG. 8, in the delivery system 10, the travel route generation section 56 sets the travel route by which the autonomous home delivery pallet 14 travels between the dispatch center 12 (see FIG. 2) and the user home 15 at which the package P is handed over. The travel route generation section 56 is also configured to modify the travel route of the autonomous home delivery pallet 14 in accordance with the package P type.

For example, in a case in which the package P is not perishable and can be delivered by standard delivery, the basic travel route is set to enable efficient delivery by the autonomous home delivery pallet 14, taking into consideration factors such as the ease of travel, distance, and journey time. However, depending on the package type, sometimes the basic travel route is determined to be inappropriate.

More specifically, in a case in which the package P contains refrigerated goods, frozen goods, or the like, an increase in the temperature of the package P during delivery would be a concern when a travel route is set to travel through sunlit areas. Accordingly, in the present exemplary embodiment, in such cases shaded areas are detected based on the position of the sun, and the travel route generation section 56 modifies the travel route of the autonomous home delivery pallet 14 to a travel route traveling through such shaded areas. This enables the autonomous home delivery pallet 14 to travel through shaded areas, enabling any increase in the temperature of the package P during delivery to be suppressed, and thus ensuring the quality of the package P.

Moreover, in a case in which the package P contains a high-value item, theft of or damage to the autonomous home delivery pallet 14 would be a concern when the autonomous home delivery pallet 14 is set to travel through areas such as busy commercial districts that are likely to be more prone to crime. Accordingly, in the present exemplary embodiment, in such cases the travel route generation section 56 modifies the travel route of the autonomous home delivery pallet 14 to a travel route traveling through areas such as school zones and residential streets that are likely to be less prone to crime. This enables the autonomous home delivery pallet 14 to travel through areas that are likely to be less prone to crime, enabling the autonomous home delivery pallet 14 to be suppressed from coming to harm.

Moreover, in a case in which the package P contains food, wild birds and animals approaching the autonomous home delivery pallet 14 would be a concern when the autonomous home delivery pallet 14 is set to travel through areas such as parks in which there are likely to be more wild birds and animals. Accordingly, in the present exemplary embodiment, in such cases the travel route generation section 56 modifies the travel route of the autonomous home delivery pallet 14 to a travel route traveling through areas such as residential streets in which there are likely to be fewer wild birds and animals. This enables the autonomous home delivery pallet 14 to travel through areas in which there are likely to be fewer wild birds and animals, enabling harm due to wild birds and animals to be suppressed.

Note that as illustrated in FIG. 8, in the present exemplary embodiment, the travel route generation section 56 is provided on the server 20 side as part of the functional configuration of the CPU 40 of the server 20 at the dispatch center 12. However, there is no limitation thereto. For example, the travel route generation section 56 may be provided on the autonomous home delivery pallet 14 side as part of the functional configuration of the CPU 58 of the autonomous home delivery pallet 14.

Moreover, in the present exemplary embodiment, the travel control section 84 is provided on the autonomous home delivery pallet 14 side as part of the functional configuration of the CPU 58, however, the travel control section 84 may be provided on the server 20 side.

Moreover, in the present exemplary embodiment, setting is made such that the travel control section 84 does not permit the autonomous home delivery pallet 14 to travel in a case in which the autonomous home delivery pallet 14 has not satisfied the travel-permitting condition; however, such a setting is not essential.

Moreover, in the exemplary embodiment described above, an unlock code generation section, a notification section, a determination section, and reception section are provided as internal configurations of the server 20; however, one or more of these sections may be provided as an internal configuration of another external device.

Note that the processing executed by the CPUs reading and executing software (a program) in the above exemplary embodiment may be executed by various types of processor other than a CPU. Such processors include programmable logic devices (PLD) that allow circuit configuration to be modified post-manufacture, such as a field-programmable gate array (FPGA), and dedicated electric circuits, these being processors including a circuit configuration custom-designed to execute specific processing, such as an application specific integrated circuit (ASIC). The processing of the above exemplary embodiment may be executed by any one of these various types of processor, or by a combination of two or more of the same type or different types of processor (such as plural FPGAs, or a combination of a CPU and an FPGA). The hardware structure of these various types of processors is more specifically an electric circuit combining circuit elements such as semiconductor elements.

Moreover, although explanation has been given regarding an implementation in which processing programs of the above exemplary embodiment are pre-stored (installed) in ROM or storage, there is no limitation thereto. Such programs may be provided in a format recorded on a recording medium such as compact disc read only memory (CD-ROM), digital versatile disc read only memory (DVD-ROM), or universal serial bus (USB) memory. Alternatively, such programs may be downloadable from an external device over a network.

What is claimed is:

1. An autonomous delivery box, comprising:
    a first memory;
    a first processor coupled to the first memory; and
    a delivery box configured to house a package,
    the autonomous delivery box being configured to travel autonomously between a dispatch base from which the package is dispatched and a handover location at which the package is handed over, and
    the first processor being configured to:
        authenticate opening permission for a door of the delivery box, and
        control whether or not the autonomous delivery box is permitted to travel such that the autonomous delivery box is not permitted to travel in a case in which a travel-permitting condition of the autonomous delivery box has not been satisfied at the handover location, wherein
    the first processor is further configured to change an authentication level according to an insured value of the package.

2. The autonomous delivery box of claim 1, wherein the travel-permitting condition includes the door being closed.

3. The autonomous delivery box of claim 2, wherein the travel-permitting condition further includes completion of a handover procedure to a user who receives the package.

4. The autonomous delivery box of claim 1, wherein the autonomous delivery box is provided with a plurality of the delivery boxes.

5. A delivery system in which the autonomous delivery box of claim 1 travels between the dispatch base from which the package is dispatched and the handover location at which the package is handed over in order to deliver the package from the dispatch base to the handover location, the delivery system comprising:
    a second memory; and
    a second processor coupled to the second memory,
    the second processor being configured to:
        set a travel route for the autonomous delivery box to travel between the dispatch base and the handover location, and
        modify the travel route of the autonomous delivery box in accordance with a type of the package.

6. The delivery system of claim 5, wherein, in a case in which the package contains refrigerated goods or frozen goods, the second processor modifies the travel route of the autonomous delivery box to a travel route traveling through shaded areas.

7. The delivery system of claim 5, wherein, in a case in which the package contains a high-value item, the second processor modifies the travel route of the autonomous delivery box to a travel route traveling through areas less prone to crime.

8. The delivery system of claim 5, wherein, in a case in which the package contains food, the second processor modifies the travel route of the autonomous delivery box to a travel route traveling through areas in which there are few wild birds and animals.

* * * * *